United States Patent
Malahe et al.

(10) Patent No.: US 11,074,691 B1
(45) Date of Patent: Jul. 27, 2021

(54) SYSTEMS AND METHODS FOR ESTIMATING PLANT AGE

(71) Applicant: Aerobotics (Pty) Ltd, Cape Town (ZA)

(72) Inventors: Michael Malahe, Cape Town (ZA); Benjamin Chaim Meltzer, Cape Town (ZA); Stuart Allan Van Der Veen, Venice, CA (US); Garth Samuel Dominic Wasson, Cape Town (ZA)

(73) Assignee: Aerobotics (Pty) Ltd, Cape Town (ZA)

(*) Notice: Subject to any disclaimer, the term of this patent is extended or adjusted under 35 U.S.C. 154(b) by 0 days.

(21) Appl. No.: 17/223,895

(22) Filed: Apr. 6, 2021

Related U.S. Application Data

(63) Continuation of application No. PCT/US2021/025647, filed on Apr. 2, 2021.
(Continued)

(51) Int. Cl.
*G06K 9/00* (2006.01)
*G06T 7/00* (2017.01)
(Continued)

(52) U.S. Cl.
CPC .............. *G06T 7/0012* (2013.01); *A01G 7/00* (2013.01); *B64C 39/024* (2013.01);
(Continued)

(58) Field of Classification Search
CPC ...... G06N 3/084; G06N 3/0454; G06N 20/00; G06N 5/046; G06N 3/0445; G06N 3/006; G06N 3/02; G06N 3/0472; G06N 3/088; G06N 3/126; G06N 7/005; G06N 20/20; G06N 5/003; G06N 20/10; G06N 3/0427; G06N 3/0436; G06N 3/049; G06N 3/086;
(Continued)

(56) References Cited

U.S. PATENT DOCUMENTS

| | | | |
|---|---|---|---|
| 9,922,261 B2 | 3/2018 | Isler et al. | |
| 2008/0260237 A1* | 10/2008 | Savolainen | G06K 9/0063 382/154 |

(Continued)

OTHER PUBLICATIONS

American Society of Agronomy, Drones effective tools for fruit farmers, Jan. 8, 2020, 4 pgs.
(Continued)

*Primary Examiner* — Alex Kok S Liew
(74) *Attorney, Agent, or Firm* — Morgan, Lewis & Bockius LLP

(57) ABSTRACT

Methods for estimating plant age are provided. A first dataset comprising a first plurality of images of a first plurality of plants is obtained, including for each plant of the first plurality of plants, one or more first plant features. A second dataset comprising, for each plant of the first plurality of plants, a respective second plant location and plant age is obtained. The one or more first plant features and plant age for plants in the first plurality of plants are used to train a model for plant age determination. A third dataset comprising a second plurality of images of a second agricultural plot is obtained, including for a second plurality of plants in the second agricultural plot one or more corresponding second plant features. Ages for plants in the second plurality of plants are estimated by inputting one or more respective second plant features into the trained model.

19 Claims, 11 Drawing Sheets

Related U.S. Application Data

(60) Provisional application No. 63/037,919, filed on Jun. 11, 2020.

(51) Int. Cl.
*A01G 7/00* (2006.01)
*B64C 39/02* (2006.01)
*G06N 20/00* (2019.01)
*G06N 5/04* (2006.01)
*G06K 9/62* (2006.01)
*G06T 7/73* (2017.01)
*G06K 9/46* (2006.01)

(52) U.S. Cl.
CPC ....... *G06K 9/00657* (2013.01); *G06K 9/4604* (2013.01); *G06K 9/6256* (2013.01); *G06N 5/04* (2013.01); *G06N 20/00* (2019.01); *G06T 7/73* (2017.01); *B64C 2201/123* (2013.01); *G06T 2207/30188* (2013.01)

(58) Field of Classification Search
CPC ............ G06N 3/08; G06N 3/04; G06N 5/025; G06N 3/063; G06N 5/04; G06N 5/043; G05B 13/028; G05B 19/4183; G05B 19/4184; G05B 19/41845; G05B 19/4185; G05B 19/41865; G05B 19/41875; G06K 9/00657; G06K 9/00; G06K 2009/00644; G06K 9/6256; G06K 9/628; H04L 1/0002; H04L 1/0041; H04L 1/18
See application file for complete search history.

(56) References Cited

U.S. PATENT DOCUMENTS

| | | | |
|---|---|---|---|
| 2010/0198775 A1* | 8/2010 | Rousselle | G06K 9/00657 706/54 |
| 2016/0307329 A1 | 10/2016 | Isler et al. | |
| 2019/0377946 A1* | 12/2019 | Genty | G06K 9/00664 |

OTHER PUBLICATIONS

Apolo-Apolo, Deep learning techniques for estimation of the yield and size of citrus fruits using a UAV, European Jouranl of Agronomy, Feb. 21, 2020, 1161-0301, 11 pgs.

Dorj, An yield estimation in citrus orchards via fruit detection and counting using image processing, Computers and Electronics in Agriculture 140 (2017) May 17, 2017, 103-112, 10 pgs.

Robson, Andrew et al., "Using Worldview Satellite Imagery to Map Yield in Avocado (*Persea americana*): A Case Study in Bundaberg, Australia," MPDI, Remote Sensing in Agriculter and Vegetation, Nov. 27, 2017, downloaded from https://www.mdpi.com/2072-4292/9/12/1223/htm, 34 pgs.

* cited by examiner 508 cont.

510 cont.

(A)

Performing the second quality control test for a respective plant in the first plurality of plants further comprises: determining a distance between the respective plant's first plant location and its second plant location, and upon determining that the distance between the respective plant's first plant location and its second plant location is above a predetermined threshold distance, the respective plant is no longer considered. — 514

Use, for each plant in the first plurality of plants, at least one of the one or more corresponding first plant features and the respective plant age to train a model for plant age determination. — 516

Training the model for plant age determination comprises using machine learning. — 518

Obtain, in electronic format, a third dataset comprising a second plurality of images of a second agricultural plot, wherein the second plurality of images are aerial views of the second agricultural plot. — 520

The first plurality of images is obtained with a first vehicle, and the second plurality of images is obtained with a second vehicle. — 522

Tree Age Report - Summary

| Reference | Acres | GPS Coordinates /Legal |
|---|---|---|
| 1083874 | 625 | 26.969492017774709, -81.7105698300781 /46 38S 25E |

Open in Aeroview

| Leaf Year | # Trees | % Total |
|---|---|---|
| D/M | 300 | 32% |
| 1 | 230 | 25% |
| 2 | 509 | 55% |
| 3 | 340 | 37% |
| 4 | 1245 | 134% |
| 5 | 1236 | 133% |
| 6 | 2324 | 251% |
| 7 | 3225 | 348% |
| 8 | 2029 | 219% |
| 9+ | 5000 | 539% |
| Total | 16438 | |

Tree Age Report — 702

| Reference | CLU | GPS Coordinates /Legal | Acres | Crop | Spacing | Collection Date |
|---|---|---|---|---|---|---|
| 1083874 | 60345376 | 26.96949201774709, -81.71056983007817 /46 38S 25E | 75.2 | Orange, Hamlin | 18x23 | 23 Apr, 2020 |

| Leaf Year | # Trees | % Total |
|---|---|---|
| D/M | 0 | 0% |
| 1 | 27 | 3% |
| 2 | 10 | 1% |
| 3 | 15 | 2% |
| 4 | 6 | 1% |
| 5 | 17 | 2% |
| 6 | 54 | 6% |
| 7 | 105 | 11% |
| 8 | 174 | 19% |
| 9+ | 519 | 56% |
| Total | 927 | |

Open in Aeroview

US 11,074,691 B1

SYSTEMS AND METHODS FOR ESTIMATING PLANT AGE

RELATED APPLICATIONS

This application is a continuation of International Application PCT/US21/25647, filed, Apr. 2, 2021, which claims priority to U.S. Provisional App No. 63/037,919, filed Jun. 11, 2020, each of which is hereby incorporated by reference in its entirety.

TECHNICAL FIELD

This specification describes using aerial views obtained from an agricultural plot to estimate plant ages (e.g., a distribution of plant ages), plant health (e.g., estimate yield potential of individual plants), or other characteristics of the agricultural plot (e.g., percent stand, etc.).

BACKGROUND

The accurate prediction of crop yield, the determination of plant health, and the assessment of when to replant are central issues in agriculture. Such determinations enable farmers to plan appropriately for current and future seasons. For example, knowing the age of plants within particular plot informs on when the plot will require replanting to provide optimal harvest for balancing crop yield across multiple seasons (e.g., it is beneficial for a farmer to have a steady, predictable crop yield, which is provided by having as many plants at optimal yield ages as possible). Older plants are often more disease-prone but also are often more productive (e.g., have a higher crop yield) than younger plants. Current methods of plant age determination rely, in great part, on labor-intensive manual assessments of each individual plant.

Given the above background, robust techniques for accurately estimating plant age and/or health are needed in the art.

SUMMARY

The present disclosure addresses the shortcomings identified in the background by providing robust techniques for estimating plant age through determinations of plant size (e.g., from canopy area). With improved methods of image analysis to evaluate individual plants in large agricultural plots, more accurate estimates of plant age and other characteristics are possible. Further, determination of plant health metrics (e.g., bearing potential) can also be performed via image analysis, which metrics can, in some instances, contribute to predicting plant age. Such information can in turn be used to improve overall farming efficiency (e.g., by determining whether growth conditions are optimal, whether plants need to be replaced, etc.).

One aspect of the present disclosure provides a method of estimating plant age. The method comprises obtaining, in electronic format, a first dataset comprising a first plurality of images of a first plurality of plants in a first agricultural plot, where the first plurality of images are aerial views of the first agricultural plot. The method further includes extracting from the first dataset, for each plant of the first plurality of plants, one or more corresponding first plant features, including a corresponding first plant location. The method further includes obtaining, in electronic format, a second dataset comprising, for each plant of the first plurality of plants growing in the first agricultural plot, a respective second plant location and a respective plant age. The method further comprises associating each plant of the first plurality of plants with its respective plant age by correlating each plant's respective first plant location with its respective second plant location. The method further includes using, for each plant in the first plurality of plants, at least one of the one or more corresponding first plant features and the respective plant age to train a model for plant age determination. The method further comprises obtaining, in electronic format, a third dataset comprising a second plurality of images of a second agricultural plot, where the second plurality of images are aerial views of the second agricultural plot. The method further includes extracting from the third dataset, one or more corresponding second plant features for a second plurality of plants in the second agricultural plot. The method further comprises estimating, for each of the second plurality of plants, the respective age of the plant by inputting at least some of the plant's respective one or more second plant features into the trained model.

In some embodiments, the associating further comprises performing one or more quality control tests by comparing the first and second datasets, comprising at least one of (i) a first quality control test for the first agricultural plot, and (ii) a second quality control test for each respective plant in the first plurality of plants.

In some embodiments, the first agricultural plot comprises a plurality of rows, where each row in the plurality of rows includes a respective set of plants of the first plurality of plants. In some embodiments, the associating comprises performing the first quality control test. In some embodiments, for each row in the plurality of rows, the first quality control test for the first agricultural plot comprises identifying, from the second dataset, a respective initial plant with a respective first plant location and a respective second plant location, and determining a distance between the initial plant's first plant location and its second plant location. In some embodiments, upon determining that the distance between the initial plant's first plant location and its second plant location is above a predetermined threshold distance, no longer considering the respective row.

In some embodiments, the associating comprises performing the second quality control test. In some such embodiments, performing the second quality control test for a respective plant in the first plurality of plants further comprises: determining a distance between the respective plant's first plant location and its second plant location, and upon determining that the distance between the respective plant's first plant location and its second plant location is above a predetermined threshold distance, no longer considering the respective plant (e.g., excluding the row from the first set of plants used to train the model).

In some embodiments, the method further comprises estimating, for all plants in the second plurality of plants, all plants' respective plant ages by applying each respective plant's one or more plant features to the trained model.

In some embodiments, the method further comprises training an additional model for plant segmentation. In some embodiments, the training comprises obtaining, in electronic format, a segmentation training dataset, where the segmentation training dataset comprises a plurality of training images, where each training image is a respective aerial view of a training agricultural plot. In some embodiments, the training further comprises determining, from the plurality of training images, for each respective plant in a plurality of training plants, a corresponding plant contour. In some embodiments, the training further comprises using, for each respective plant in the plurality of training plants, at least the respective training image and the corresponding plant contour to train the additional model for plant segmentation.

In some embodiments, the extracting from the first dataset further comprises, for each plant in the first plurality of plants: identifying a respective plant contour by applying at least one image from the first plurality of images to the trained additional model, and determining, from the respective plant contour, the one or more corresponding first plant features.

In some embodiments, the extracting from the third dataset further comprises, for each plant in the second plurality of plants: identifying a respective plant contour by applying at least one image from the second plurality of images to the trained additional model, and determining, from the respective plant contour, the one or more corresponding second plant features.

In some embodiments, the one or more corresponding first plant features and the one or more corresponding second plant features each comprise one or more plant features selected from the group consisting of: plant canopy area, plant canopy circumference, plant canopy diameter, and a combination thereof.

In some embodiments, for each respective plant in the first plurality of plants, the respective first plant location is centered on the respective plant canopy area.

In some embodiments, the one or more corresponding second plant features includes, for each plant of the second plurality of plants a corresponding third plant location.

In some embodiments, each respective first plant location, each respective second plant location, and each respective third plant location comprises GPS coordinates.

In some embodiments, each respective plant age comprises a scion plant age (e.g., a leaf year indicating the age of the plant's canopy).

In some embodiments, plants growing in the first and second agricultural plots are of the same type (e.g., of a same species and/or same varietal within a species).

In some embodiments, the second agricultural plot comprises a plurality of hedgerows with predetermined hedgerow spacing (e.g., each hedgerow in the plurality of hedgerows includes a respective set of one or more plants from the second plurality of plants with predetermined plant spacing and a respective initial plant location. In some embodiments, for each plant in a respective set of one or more plants in a respective hedgerow, the one or more corresponding second plant features each comprise one or more plant features selected from the group consisting of: a respective hedge canopy area and a respective hedge canopy circumference, hedge canopy diameter, and a combination thereof. In some embodiments, the method further comprises for each plant in a respective set of one or more plants in a respective hedgerow: determining a respective fourth plant location based at least in part on the predetermined plant spacing and the respective initial plant location for the respective hedgerow, and comparing the respective third plant location to the respective fourth plant location. In some embodiments, the respective plant is deemed missing when the comparison of the respective third plant location and the respective fourth plant location is above a predetermined distance threshold. In some embodiments, the method further comprises determining, for each hedgerow in the plurality of hedgerows, a percentage of missing plants, where a respective hedgerow is deemed missing when the percentage of missing plants is above a predetermined missing plant threshold.

In some embodiments, the first plurality of images (e.g., the plurality of images obtained for training the model) is obtained with a first vehicle, and the second plurality of images (e.g., the plurality of images obtained from an agricultural plot that are to be used to estimate plant ages) is obtained with a second vehicle. In some embodiments, the first and second vehicle is one or more unmanned aerial vehicles (UAV). In some embodiments, the first and second vehicle is one or more satellites. In some embodiments, the method further comprises obtaining: a first route record for the first vehicle corresponding to the first plurality of images, where the first route record comprises a first record over the first agricultural plot; and a second route record for the second vehicle corresponding to the second plurality of images, where the second route record comprises a first record over the second agricultural plot. In some embodiments, the first route record further comprises a respective height (e.g., a height of the first vehicle while obtaining images in the first plurality of images) and a respective location (e.g., GPS location) for each image in the first plurality of images. Similarly, in some embodiments, the second route record further comprises a respective height and a respective location for each image in the second plurality of images. In some embodiments, each image in the first plurality of images is evaluated for satisfaction of one or more validation criteria, and each image in the second plurality of images is evaluated for satisfaction of one or more validation criteria.

In some embodiments, the first vehicle and the second vehicle include an RGB camera. In some embodiments, each image in the first and second plurality of images comprises a corresponding RGB image. In some embodiments, the method further comprises determining from the second plurality of images, for each plant in the second plurality of plants, a respective canopy color. In some embodiments, the method further comprises determining a corresponding health score for each respective plant in the second plurality of plants based at least in part on the respective canopy color for each plant. In some embodiments, a respective plant with a corresponding health score below a health score threshold is deemed non-bearing.

In some embodiments, the method further comprises repeating the method at one or more time points, thereby obtaining one or more updates of plant age.

In some embodiments, the method further comprises providing a respective confidence value for each respective plant age.

In some embodiments, the plants are of a plant type selected from the group consisting of blueberries, grapes, cherries, plums, peaches, nectarines, apricots, olives, mangos, pears, apples, quinces, loquats, citrus, figs, papayas, avocados, coconuts, durians, guavas, persimmons, and pomegranates. In some embodiments, the plants are any perennial crop plant.

In some embodiments, the method further comprises displaying a histogram of plant age using the ages for the second plurality of plants. In some embodiments, the method further comprises identifying one or more plants with a respective age greater than an age threshold.

In some embodiments, the method further comprises determining a percent stand for the second agricultural plot based at least in part on a plot area of the second agricultural plot and a total plant area of the second plurality of plants, where the total plant area is determined from the corresponding one or more second plant features for each respective plant in the second plurality of plants.

In some embodiments, training the model for plant age determination comprises using machine learning. In some embodiments, the trained model for plant age determination is based at least in part on a neural network algorithm, a support vector machine algorithm, a decision tree algorithm, an unsupervised clustering algorithm, a supervised clustering algorithm, a linear regression algorithm, a logistic regression algorithm, a mixture model, a generalized linear model, a threshold segmentation algorithm, a Markov chain model, a hidden Markov model, a dynamic Bayesian network model, or a combination thereof.

In some embodiments, the method further comprises obtaining historical age information for the second agricultural plot, including corresponding historical age information for at least an additional subset of plants of the second plurality of plants, and estimating, for each of the additional subset of plants, the respective age of the plant by inputting at least some of the plant's respective one or more second plant features and corresponding historical age information into the trained model. In some embodiments, the historical age information comprises a historical plurality of images of the second agricultural plot, where the historical plurality of images are aerial views of the second agricultural plot (e.g., from an earlier time point such as a previous season, a previous month, a previous year, etc.).

Other embodiments are directed to systems, portable consumer devices, and computer readable media associated with the methods described herein. As disclosed herein, any embodiment disclosed herein can be applied in some embodiments to any other aspect. Additional aspects and advantages of the present disclosure will become readily apparent to those skilled in this art from the following detailed description, where only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

FIGS. 5A, 5B, and 5C collectively illustrate examples of flowcharts of methods of determining plant age from aerial view images, in accordance with some embodiments of the present disclosure.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

The implementations described herein provide various technical solutions for estimating plant age of plants growing in an agricultural plot.

Several aspects are described below with reference to example applications for illustration. It should be understood that numerous specific details, relationships, and methods are set forth to provide a full understanding of the features described herein. One having ordinary skill in the relevant art, however, will readily recognize that the features described herein can be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

Figure 1:
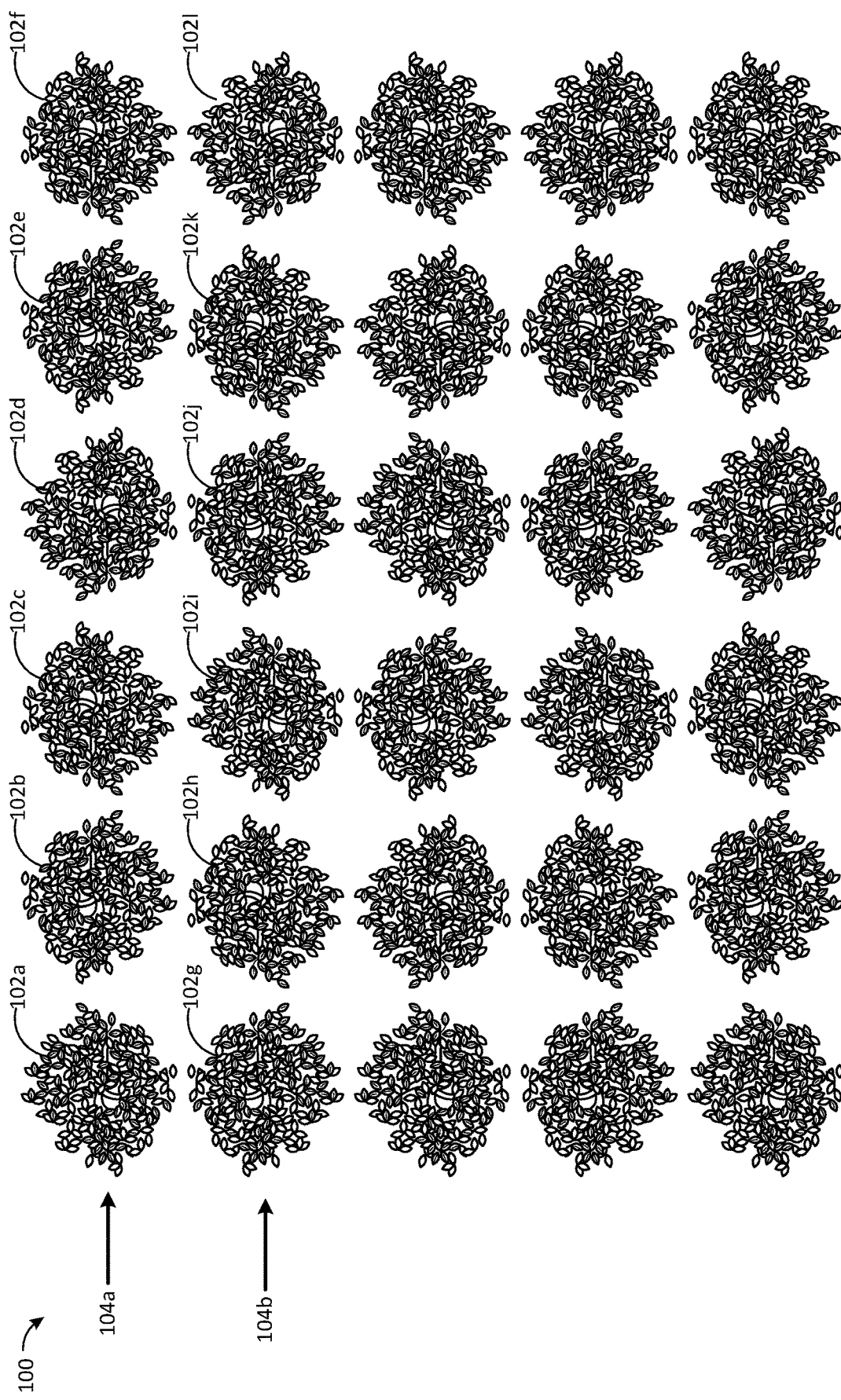
FIG. 1 illustrates an example agricultural plot with multiple rows, in accordance with some embodiments of the present disclosure.

FIG. 1 illustrates example rows 104 (e.g., row 104*a* and row 104*b*) in an agricultural plot 100, in accordance with some embodiments of the present disclosure. In some embodiments, the agricultural plot comprises a plurality of trees 102 arranged in rows (e.g., the agricultural plot is an orchard, a vineyard, etc.), where each row comprises a respective set of plants (e.g., set 102*a*-102*f* and set 102*g*-102*l*). In some embodiments, the agricultural plot is imaged by an unmanned aerial vehicle (UAV) 210 or other vehicle situated (e.g., flying) above the orchard to obtain images during an aerial survey (also referred to as a scouting mission or a mission). The images collected during aerial surveys are used to estimate plant age for each plant growing in the agricultural plot, as described throughout the present disclosure.

Figure 2:
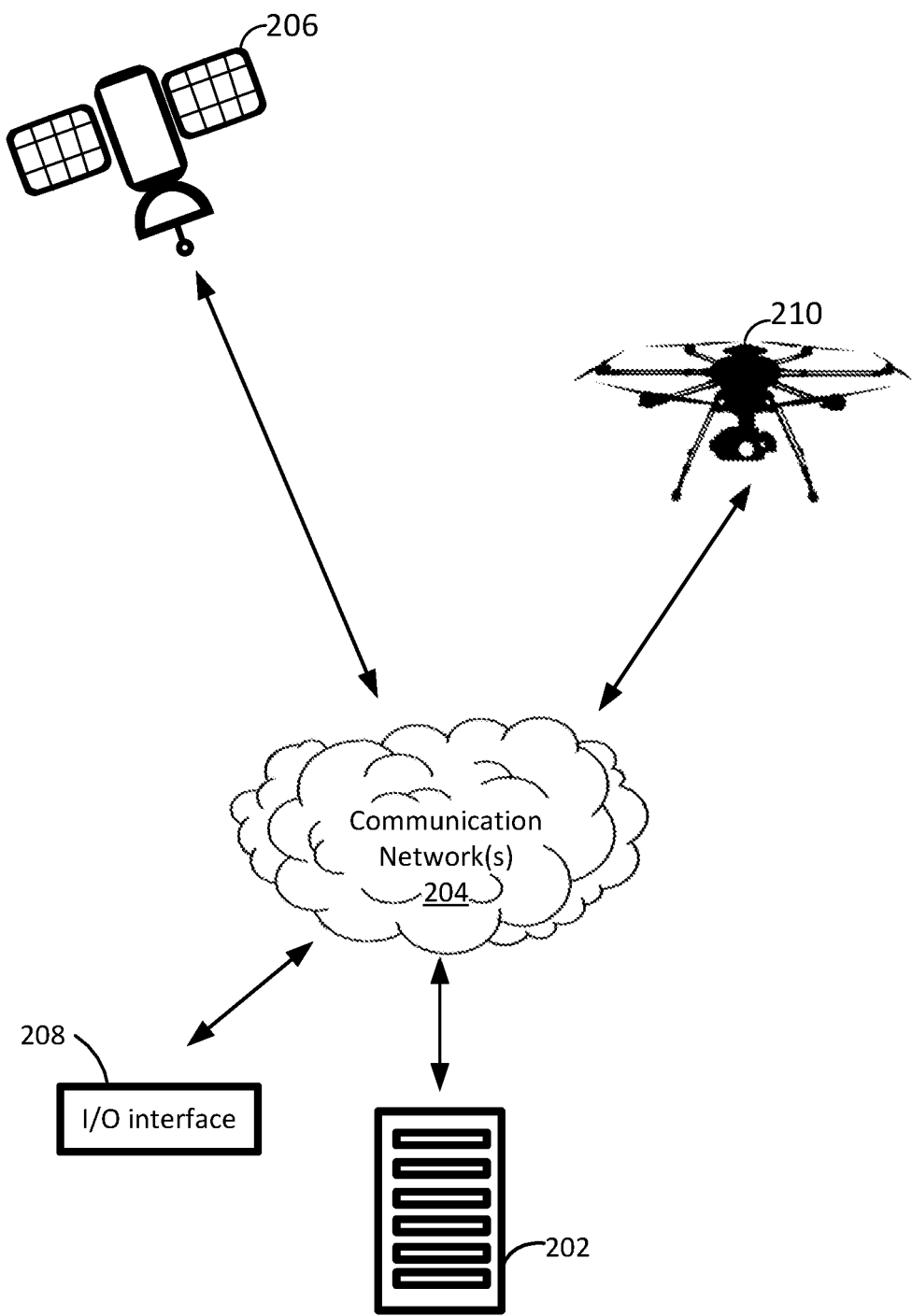
FIG. 2 illustrates example communications connections of various devices, in accordance with some embodiments of the present disclosure.

FIG. 2 illustrates example communications connections of various devices, in accordance with some embodiments of the present disclosure. For example, in some embodiments, UAV 210, server 202, satellite 206, and user interface 208 (e.g., a device with a human-operable user interface, such as a desktop computer, laptop computer, tablet, mobile phone, or the like) communicate through one or more communications networks 204. In some embodiments, the one or more networks 204 include public communication networks, private communication networks, or a combination of both public and private communication networks. For example, the one or more networks 204 can be any network (or combination of networks) such as the Internet, other wide area networks (WAN), local area networks (LAN), virtual private networks (VPN), metropolitan area networks (MAN), peer-to-peer networks, and/or ad-hoc connections. In some embodiments, UAV 210 and/or server 202 communicate with satellite 206 using TCP/IP.

Figure 3:
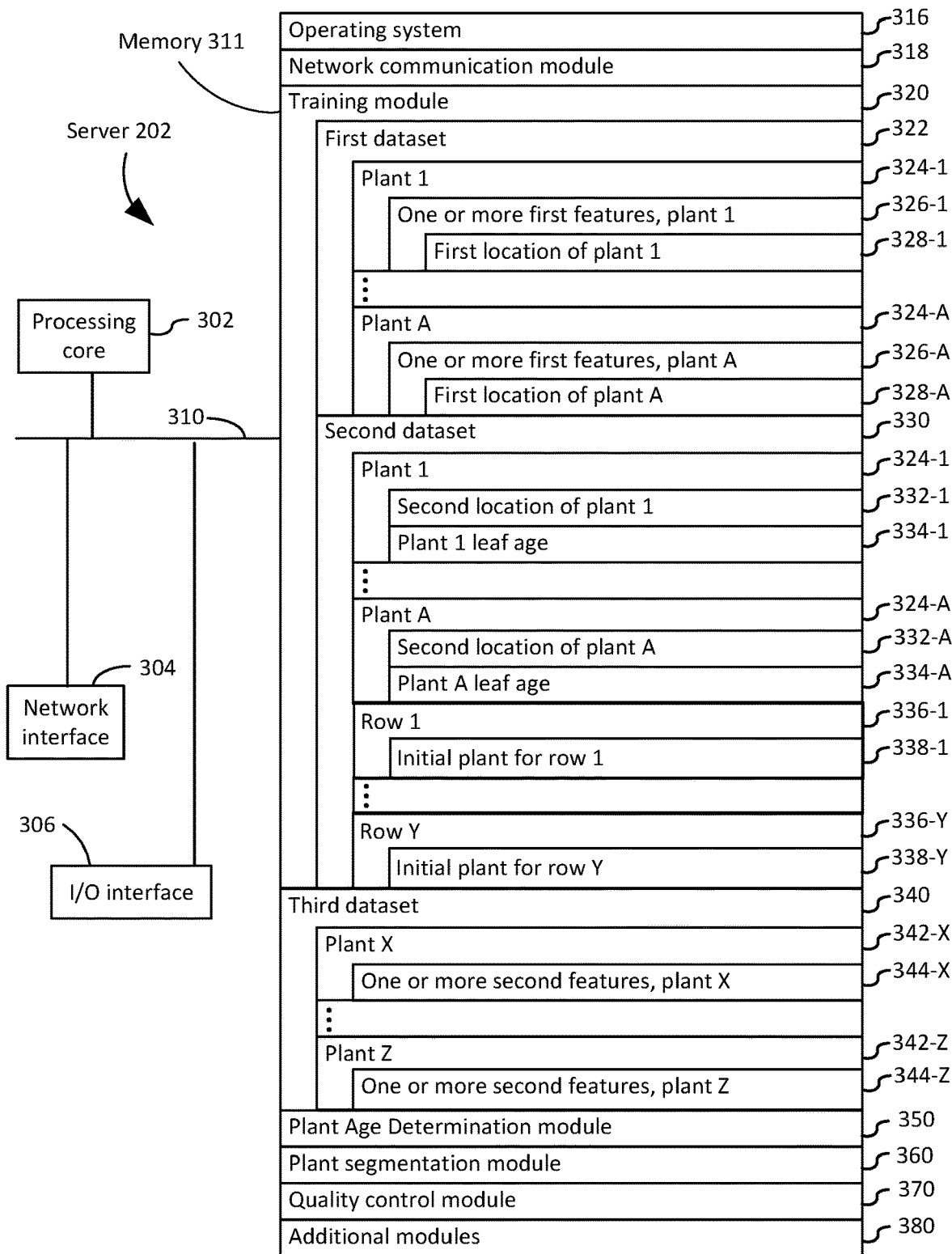
FIG. 3 illustrates a block diagram of a system (e.g., an exemplary server) in accordance with some embodiments of the present disclosure.
Figure 4:
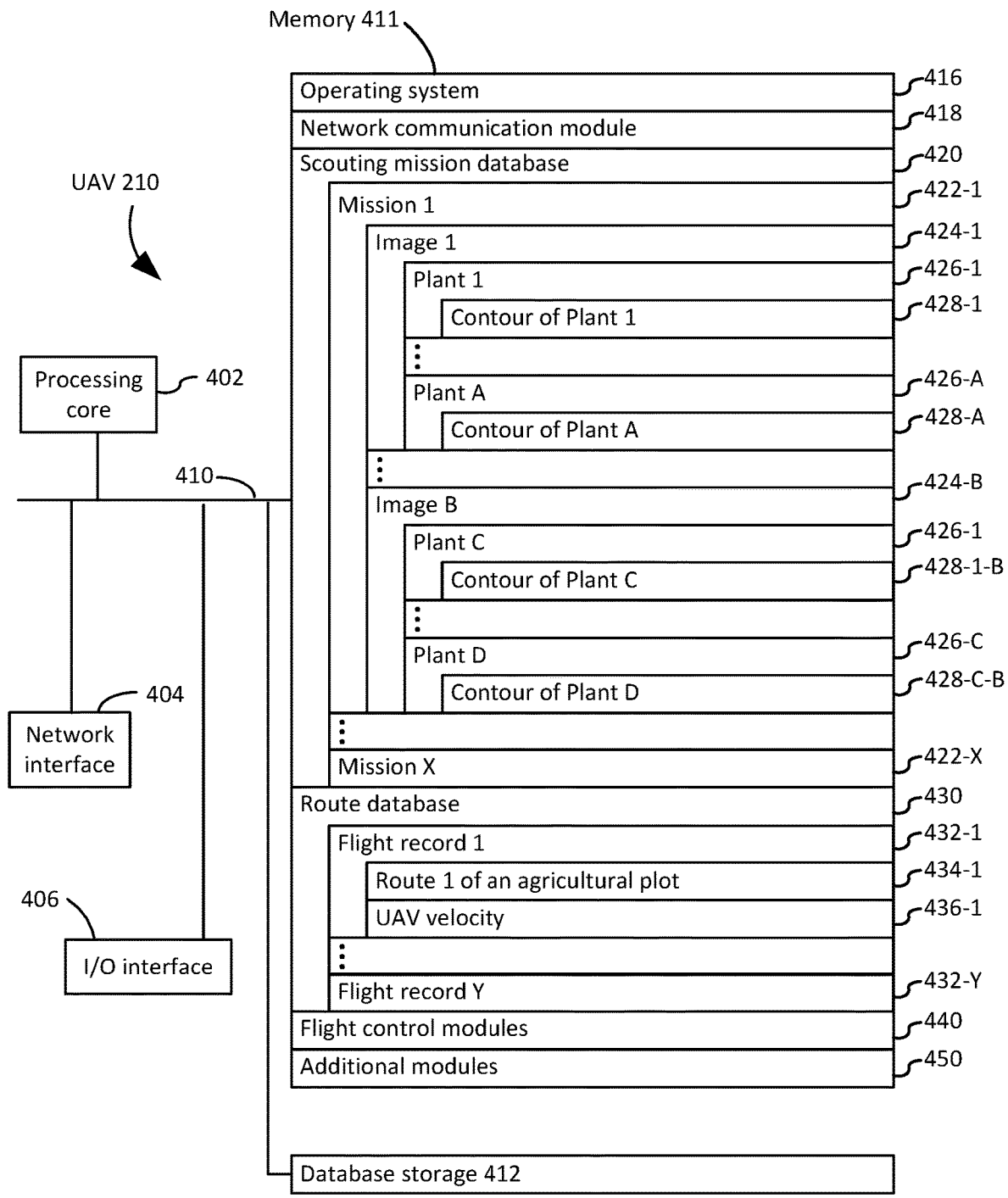
FIG. 4 illustrates a block diagram of a system (e.g., an exemplary vehicle or other image collection device) in accordance with some embodiments of the present disclosure.

Details of exemplary systems are now described in conjunction with FIGS. 3 and 4. FIG. 3 illustrates an exemplary server 202 as shown in FIG. 2. In some embodiments, server 202 includes one or more processing units CPU(s) 302 (also referred to as processors), one or more network interfaces 304, memory 311 for storing programs and instructions for execution by the one or more processors 302, one or more communications interfaces such as input/output interface 306, and one or more communications buses 310 for interconnecting these components.

The one or more communication buses 310 optionally include circuitry (sometimes called a chipset) that interconnects and controls communications between system components. The memory 311 typically includes high-speed random access memory, such as DRAM, SRAM, DDR RAM, ROM, EEPROM, flash memory, CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. Memory 311 optionally includes one or more storage devices remotely located from the CPU(s) 302. Memory 311, and the non-volatile memory device(s) within the memory 311, comprise a non-transitory computer readable storage medium.

In some embodiments, memory 311 or alternatively the non-transitory computer readable storage medium stores the following programs, modules and data structures, or a subset thereof:

Operating system 316, which includes procedures for handling various basic system services and for performing hardware dependent tasks;

Network communication module (or instructions) 318 for connecting server 202 with other devices, or a communication network;

Training module 320, which includes:
A first dataset 322 and a second dataset 330, each comprising information for each plant 324 in a first plurality of plants, where the first dataset 322 includes a corresponding one or more first plant features 326 (e.g., a corresponding first plant location 328) and the second dataset 330 includes a respective second plant location and a respective plant age for each plant 324 in the first plurality of plants;

Third Dataset 340 that includes, for each plant 342 in a second plurality of plants, one or more corresponding second plant features 344;

Plant Age Determination module 350 that includes instructions for estimating, for each of at least a subset of the second plurality of plants, the respective age of the plant by inputting at least some of the plant's respective one or more second features 344 into a model trained by Training module 320;

Plant Segmentation module 360 that includes instructions for identifying plant contours from aerial images of an agricultural plot;

Quality Control Module 370 that includes instructions for a) validating row locations (e.g., identifying missing rows for embodiments where the first agricultural plot comprises a plurality of rows) by determining a respective initial plant 338 for each row in the plurality of rows and comparing the respective first plant location 328 and the respective second plant location 332 for the respective initial plant 338, and b) validating plant locations (e.g., identifying missing plants) by comparing first plant location 328 and second plant location 332 for each plant 324 in the first plurality of plants, where rows and respective plants that do not meet validation criteria (e.g., are not within predetermined threshold distances) are no longer considered; and Optionally, other modules 380 that include instructions for handling other functions and aspects described herein.

In some embodiments, optional modules 380 include a plant health determination module that includes instruction for determining respective plant health scores from determined plant color (e.g., color associated with a plant's foliage as determined from aerial views of an agricultural plot). In some embodiments, the third dataset 340 further comprises, for each plant 342 a respective color (e.g., determined from the respective plant contour). In some embodiments, color comprises Normalized Difference Red Edge (NDRE). In some embodiments, color comprises Normalized Different Vegetation Index (NDVI), Visual Atmospheric Resistance Index (VARI), Green Ratio Vegetarian Index (GRVI), Green Leaf Index (GLI), or Soil-Adjusted Vegetation Index (SAVI). In some embodiments, color comprises any other vegetation index used in the art. In some embodiments, color is determined by averaging the color for each pixel comprising the corresponding plant contour of the respective plant. In some embodiments, the averaging is weighted towards the center of the plant contour to avoid effects from any ground pixels that may be contained in the plant contour (e.g., ground pixels that may be visible between pixels corresponding to leaves).

In various implementations, one or more of the above identified elements are stored in one or more of the previously mentioned memory devices, and correspond to a set of instructions for performing a function described above. The above identified modules, data, or programs (e.g., sets of instructions) need not be implemented as separate software programs, procedures, datasets, or modules, and thus various subsets of these modules and data may be combined or otherwise re-arranged in various implementations. In some implementations, memory 311 optionally stores a subset of the modules and data structures identified above. Furthermore, in some embodiments, the memory stores additional modules and data structures not described above. In some embodiments, one or more of the above identified elements is stored in a computer system, other than that of server 202, that is addressable by server 202 so that server 202 may retrieve all or a portion of such data when needed.

Although FIG. 3 depicts server 202, the figure is intended more as a functional description of the various features that may be present in computer systems than as a structural schematic of the implementations described herein. In practice, and as recognized by those of ordinary skill in the art, items shown separately could be combined and some items could be separated.

FIG. 4 illustrates an exemplary UAV 210 as shown in FIG. 2. In some embodiments, UAV 210 includes one or more processing units CPU(s) 402 (also referred to as processors), one or more network interfaces 404, memory 411 for storing programs and instructions for execution by the one or more processors 402, one or more communications interfaces such as input/output interface 406, and one or more communications buses 410 for interconnecting these components.

The one or more communication buses 410 optionally include circuitry (sometimes called a chipset) that interconnects and controls communications between system components. The memory 411 typically includes high-speed random access memory, such as DRAM, SRAM, DDR RAM, ROM, EEPROM, or flash memory, CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. The database 412 optionally includes one or more storage devices remotely located from the CPU(s) 402. The database 412, and the non-volatile memory device(s) within the database 412, comprise a non-transitory computer readable storage medium. In some implementations, memory 411 and/or the non-volatile memory device(s) within memory 411 comprises a non-transitory computer readable storage medium.

In some embodiments, memory 411 and/or the non-transitory computer readable storage medium comprising memory 411 stores the following programs, modules and data structures, or a subset thereof, sometimes in conjunction with the database 412:

Operating system 416, which includes procedures for handling various basic system services and for performing hardware dependent tasks;

Network communication module (or instructions) 418 for connecting UAV 210 with other devices, or a communication network;

Scouting mission database 420, which includes:
  A plurality of missions 422, each comprising, for each image 424 in a plurality of images, a respective contour 428 for one or more plants 426;

Route database 430, which includes:
  A plurality of route records 432, each comprising a respective route 434 through an agricultural plot and a respective UAV velocity 436;

One or more flight control modules 440 that includes instructions for piloting; and Optionally, other modules 450 that include instructions for handling other functions and aspects described herein.

In various implementations, one or more of the above identified elements are stored in one or more of the previously mentioned memory devices, and correspond to a set of instructions for performing a function described above. The above identified modules, data, or programs (e.g., sets of instructions) need not be implemented as separate software programs, procedures, datasets, or modules, and thus various subsets of these modules and data may be combined or otherwise re-arranged in various implementations. In some implementations, the memory 411 optionally stores a subset of the modules and data structures identified above. Furthermore, in some embodiments, the memory stores additional modules and data structures not described above. In some embodiments, one or more of the above identified elements is stored in a computer system, other than that of UAV 210, that is addressable by UAV 210 so that UAV 210 may retrieve all or a portion of such data when needed.

Although FIG. 4 depicts UAV 210, the figure is intended more as a functional description of the various features that may be present in computer systems than as a structural schematic of the implementations described herein. In practice, and as recognized by those of ordinary skill in the art, items shown separately could be combined and some items could be separated.

In some embodiments, the one or more flight modules 450 control positioning of a respective vehicle (e.g., either a manned or unmanned aircraft) within a predefined distance threshold (e.g., the location of UAV 210 at every time is controlled within a predefined distance threshold). In some embodiments, the predefined distance threshold is less than 1 foot, less than 2 feet, less than 3 feet, less than 4 feet, less than 5 feet, less than 6 feet, less than 7 feet, less than 8 feet, less than 9 feet, less than 10 feet, less than 20 feet, less than 30 feet, less than 40 feet, or less than 50 feet. In some embodiments, a different predefined distance threshold is used for each respective vehicle (e.g., there is a distinct predefined distance threshold for a drone vs. a satellite).

Figure 5A:
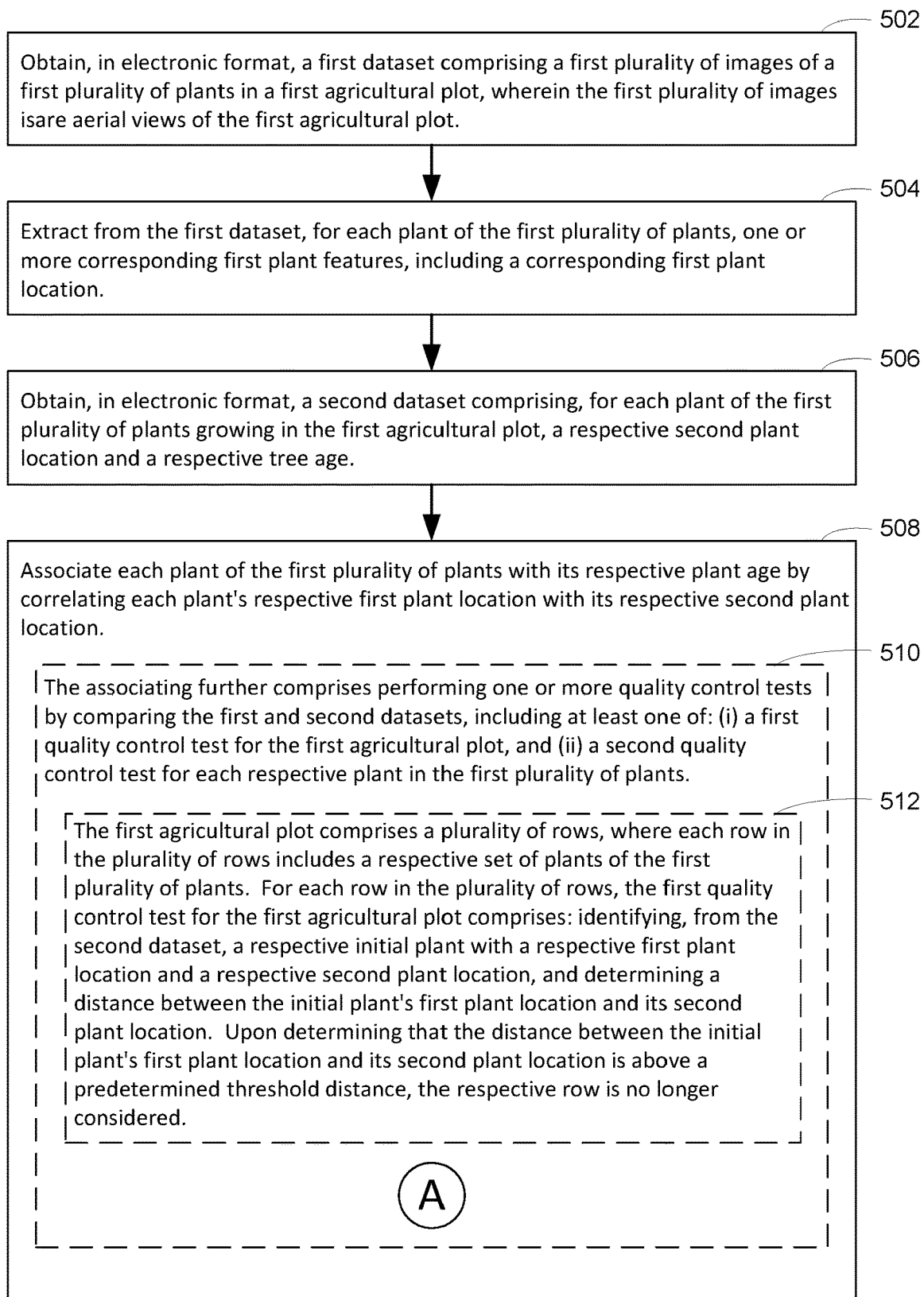
Figure 5C:
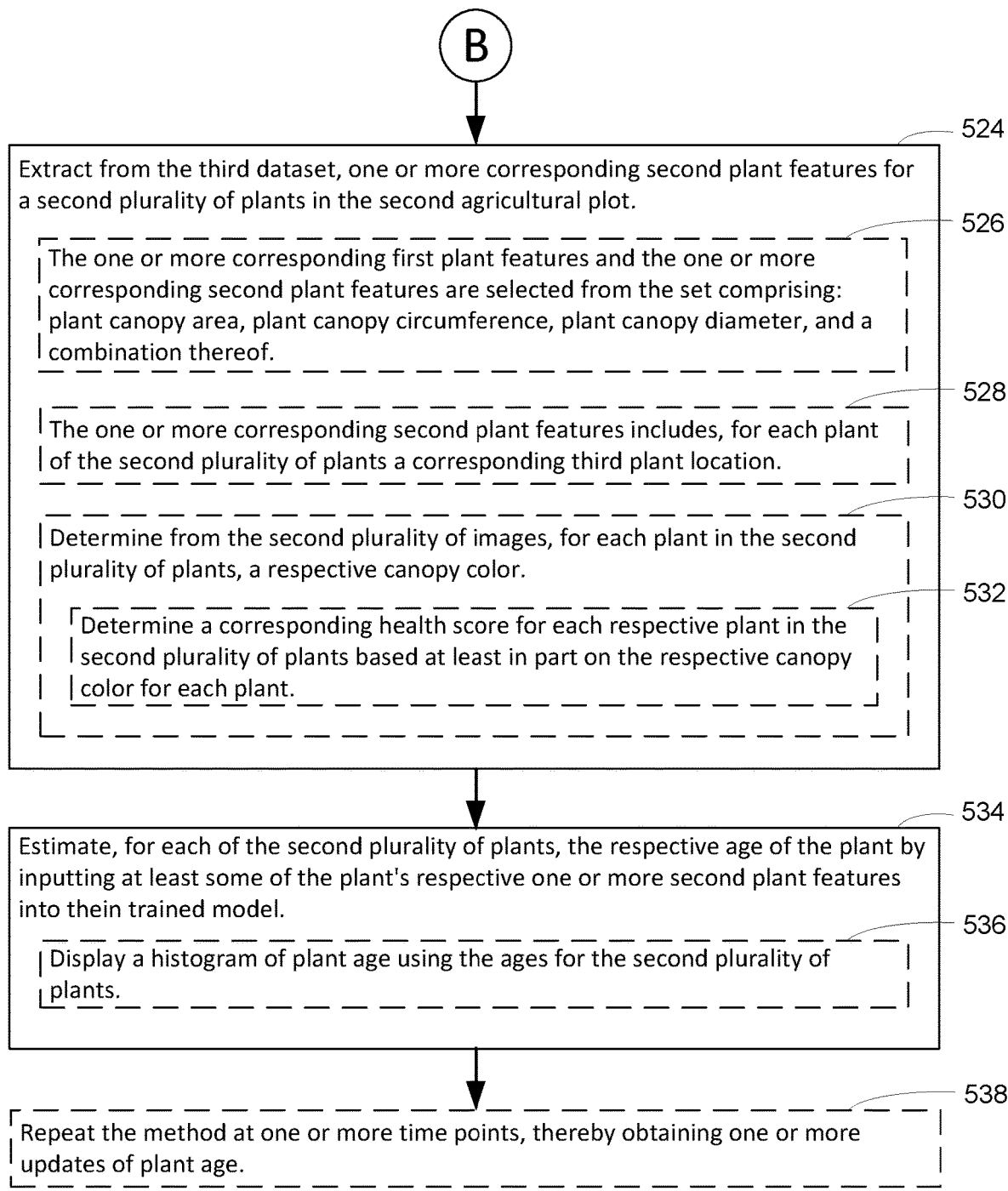

FIGS. 5A, 5B, and 5C collectively illustrate examples of flowcharts of methods of determining plant age from aerial view images, in accordance with some embodiments of the present disclosure. In some embodiments, the method is performed by a server system (e.g., server 202).

Block 502. Referring to block 502 of FIG. 5A, the method comprises obtaining, in electronic format, a first dataset comprising a first plurality of images of a first plurality of plants in a first agricultural plot (e.g., the first agricultural plot may comprise an orchard with a plurality of trees, the first agricultural plot may comprise a vineyard with a plurality of grape vines, etc.). The first plurality of images are aerial views of the first agricultural plot (e.g., the first plurality of images is obtained from above the first agricultural plot). In some embodiments, the first plurality of images is from an aerial survey (e.g., a survey made by a vehicle such as UAV 210).

Block 504. Referring to block 504, the method proceeds by extracting from the first dataset, for each plant of the first plurality of plants, one or more corresponding first plant features, including a corresponding first plant location. In some embodiments, the first plant location refers to the center of a plant's canopy (e.g., as determined from above, based at least in part on the shape of the respective plant canopy area). In some embodiments, the one or more corresponding first plant features are selected from the set comprising: plant canopy area, plant canopy circumference, plant canopy diameter, and a combination thereof. In some embodiments, plant canopy area refers to the area encompassed by a plant contour (e.g., an entire canopy area determined from an aerial survey image). In some embodiments, plant canopy circumference refers to a circumference determined from an average radius of the plant contour (e.g., the plant canopy circumference is determined from an assumption that the plant contour is circular or nearly circular). In some embodiments, plant canopy circumference refers to the length of the perimeter of the plant contour (e.g., the plant canopy circumference is determined regardless of the shape of the plant contour). In some embodiments, plant canopy circumference is determined based on the assumption that the plant contour is oval, square, etc. Similarly, in some embodiments, plant canopy diameter is determined based on assumptions about the shape of the plant contour (e.g., for cases where a respective plant contour is circular or nearly circular, the corresponding plant canopy diameter comprises an average diameter of the respective plant contour).

In some embodiments, the method further comprises training an additional model for distinguishing plants within an image (e.g., for identifying one or more plant contours from images in a plurality of images). In some embodiments, the training comprises obtaining, in electronic format, a segmentation training dataset comprising a plurality of training images. In some embodiments, each training image is a respective aerial view of a training agricultural plot. In some embodiments, the segmentation training dataset comprises some or part of the first dataset. In some embodiments, the segmentation training dataset is distinct from the first dataset. In some embodiments, respective images in the plurality of training images are aerial views of one or more training agricultural plots. In some embodiments, the one or more training agricultural plots are growing the same type of plant (e.g., the model for distinguishing plants within an image is trained on images of single species and/or same varietal within a species of plant). In some embodiments, at least one of the one or more training agricultural plots is growing a different plant type (e.g., the model for distinguishing plants within an image is trained on images of at least two types of plants).

In some embodiments, the trained additional model for plant contour segmentation is based at least in part on a neural network algorithm, a support vector machine algorithm, a decision tree algorithm, an unsupervised clustering algorithm, a supervised clustering algorithm, a linear regression algorithm, a logistic regression algorithm, a mixture model, a generalized linear model, a threshold segmentation algorithm, or a combination thereof.

In some embodiments, the training further comprises determining, from the plurality of training images, for each respective plant in a plurality of training plants, a corresponding plant contour. In some embodiments, each plant contour is verified (e.g., by a trained human). In some embodiments, the training further comprises using, for each respective plant in the plurality of training plants, at least the respective training image and the corresponding plant contour to train the additional model for distinguishing plants within an image.

In some embodiments, the extracting from the first dataset further comprises, for each plant in the first plurality of plants: identifying a respective plant contour by applying at least one image from the first plurality of images to the trained additional model, and determining, from the respective plant contour, the one or more corresponding first plant features.

Block 506. Referring to block 506, the method further includes obtaining, in electronic format, a second dataset comprising, for each plant of the first plurality of plants growing in the first agricultural plot, a respective second plant location, and a respective plant age. In some embodiments, the second dataset comprises information obtained from a ground survey of the first agricultural plot (e.g., performed by humans or by a terrestrial vehicle). In some embodiments, the second dataset comprises information obtained from a plurality of images of the first agricultural plot (e.g., a third plurality of images comprising aerial views of the first agricultural plot (e.g., the third plurality of images is obtained from above the first agricultural plot)). The second dataset serves as validated information for each plant in the first plurality of plants (e.g., the information in the second dataset has been obtained by human surveyors). In some embodiments, the second dataset is optional (e.g., the method only requires the first dataset to train the model for plant age determination). In some such embodiments, instead of the second dataset, historical information of the first agricultural plot (e.g., information on plant age from one or more previous seasons), and such historical information is associated with the first plurality of plants from the first plurality of images, as described below with regards to block 506. In some such embodiments, instead of the second dataset, localized information of plant characteristics (e.g., information for plants in a particular geographic location of the first agricultural plot) is used. For example, certain plant species grow larger or smaller depending on the latitude.

Block 508. Referring to block 508, the method comprises associating each plant of the first plurality of plants with its respective plant age by correlating each plant's respective first plant location with its respective second plant location (e.g., by comparing the first and second datasets). In some embodiments, comparing the first and second datasets comprises correlating, for each plant in the first plurality of plants, the one or more corresponding first plant features to the respective second plant location. In some embodiments, the associating uses a coherent point drift algorithm to correlate (e.g., as described by Myronenko and Song 2009 "Point-Set Registration: Coherent Point Drift" IEEE Trans. on Pattern Analysis and Machine Intelligence 32(12), 2262-2275). In some embodiments, the associating uses any of the methods described Holz et al (2015) for point set registration (See "Registration with the Point Cloud Library: A Modular Framework for Aligning in 3-D" IEEE Robotics Automation Magazine. 22 (4), 110-124). In some embodiments, other methods known in the art for correlating information from multiple datasets are used for the associating.

In some embodiments, referring to block 510, the associating further comprises performing one or more quality control tests by comparing the first and second datasets. In some embodiments, the one or more quality control tests comprise at least one of (i) a first quality control test for the first agricultural plot, and (ii) a second quality control test for each respective plant in the first plurality of plants. Such quality tests verify that images in the first plurality of images are being appropriately analyzed (e.g., so that each plant in the first plurality of plants is identified correctly based on its corresponding first plant features).

Referring to block 512, in some embodiments, the first agricultural plot comprises a plurality of rows (e.g., rows in an orchard, a vineyard, a berry bog, etc.). In some such embodiments, the associating comprises performing the first quality control test, and each row in the plurality of rows includes a respective set of plants of the first plurality of plants (e.g., the plants in the first plurality of plants are grouped by row). In some such embodiments, for each row in the plurality of rows, the first quality control test for the first agricultural plot comprises: identifying, from the second dataset, a respective initial plant (e.g., a first plant in the respective row) with a respective first plant location (e.g., from the first dataset) and a respective second plant location (e.g., from the second dataset), determining a distance between the initial plant's first plant location and its second plant location, and upon determining that the distance between the initial plant's first plant location and its second plant location is above a predetermined threshold distance, no longer considering the respective row (e.g., the respective row is deemed to be missing and is excluded from downstream analysis). In some embodiments, the respective first plant location of the initial plant has a predefined position in the respective image. In some embodiments, the respective first plant location of the initial plant has a predefined position in the first agricultural plot (e.g., with regards to a corner of the first agricultural plot). In some embodiments, the respective first plant location of the initial plant has a predefined position in the respective row (e.g., at an end of the respective row). In some embodiments, no longer considering the respective row comprises excluding the respective row from the first set of plants that are used to train the model for estimating plant age. In some embodiments, the first quality control test identifies rows with lower quality data (e.g., the known location as determined from a ground survey of an initial plant in a respective row does not overlap with the detected location of the initial plant from the aerial survey). This may happen, for example, if a respective image from the aerial survey (e.g., in the first dataset) is misaligned or of poor-quality.

In some embodiments, with regards to block 514 in FIG. 5B, the associating comprises performing the second quality control test, and performing the second quality control test for a respective plant in the first plurality of plants further comprises: determining a distance between the respective plant's first plant location (e.g., from the first dataset) and its second plant location (e.g., from the second dataset), and upon determining that the distance between the respective plant's first plant location and its second plant location is above a predetermined threshold distance, the respective plant is no longer considered (e.g., the respective plant is deemed to be missing and is excluded from downstream analysis).

In some embodiments, the second quality control test further comprises accumulating a list of one or more missing plants from the first plurality of plants (e.g., any respective plants for which the distance between the respective plant's first plant location and its second plant location is above the predetermined threshold distance). In some embodiments, where the list of one or more missing plants comprises at least a threshold percentage of plants from the first plurality of plants, the first plurality of plants is replaced (e.g., the first dataset is discarded and an additional mission is performed to recollect the first dataset).

Missing plants are, in some embodiments, plants that were not detected from the first plurality of images (e.g., due to technical issues or because a plant has died). In some embodiments, missing plants are plants that were damaged in some way (e.g., by pests, disease, adverse weather, etc.).

In some embodiments, the predetermined threshold distance (e.g., to determine whether a plant is missing) for the first and second quality control tests is at least 1 meter, at least 2 meters, at least 3 meters, at least 4 meters, at least 5 meters, at least 6 meters, at least 7 meters, at least 8 meters, at least 9 meters, or at least 10 meters. In some embodiments, the threshold percentage of plants (e.g., to determine whether a row is missing) for the second quality control test is at least 5% of plants, at least 10% of plants, at least 15% of plants, at least 20% of plants, at least 25% of plants, at least 30% of plants, at least 35% of plants, at least 40% of plants, at least 45% of plants, or at least 50% of plants.

In some embodiments, the first quality control test can be performed for any agricultural plot. In some embodiments, the second quality control test can be performed for any agricultural plot. In some embodiments, only the first quality control test is performed for a respective agricultural plot. In some embodiments, only the second quality control test is performed for a respective agricultural plot. In some embodiments, the second quality control test is performed after the first quality control test. In some embodiments, the second quality control test is performed before the first quality control test. In some embodiments, if a respective agricultural test fails one of the first or second quality control tests, the other quality control test is not performed.

Block 516. Referring to block 516 of FIG. 5B, the method proceeds by using, for each plant in the first plurality of plants, at least one of the one or more corresponding first plant features and the respective plant age to train a model for plant age determination. In some embodiments, at least 2, at least 3, at least 4 or at least 5 of the one or more corresponding first plant features and the respective plant are used to train the model for plant age determination.

In some embodiments, referring to block 518, training the model for plant age determination comprises using machine learning. In some embodiments, the trained model for plant age determination is based at least in part on a neural network algorithm, a support vector machine algorithm, a decision tree algorithm, an unsupervised clustering algorithm, a supervised clustering algorithm, a linear regression algorithm, a logistic regression algorithm, a mixture model, a generalized linear model, a threshold segmentation algorithm, or a combination thereof.

In some embodiments, training the model for plant age determination is repeated at least once. In some embodiments, training the model for plant age determination is repeated a predetermined number of times. For example, in some embodiments, the training comprises 10-fold cross-validation using the first and second datasets.

Block 520. Referring to block 520, the method further comprises obtaining, in electronic format, a third dataset comprising a second plurality of images of a second agricultural plot, where the second plurality of images are aerial views of the second agricultural plot. In some embodiments, plants growing in the first and second agricultural plots are all of the same type (e.g., same species and/or same varietal within a species). Thus, in some embodiments, the model for plant age determination is trained on plants of a single type. In some embodiments, the plants are of a plant type selected from the group consisting of blueberries, grapes, cherries, plums, peaches, nectarines, apricots, olives, mangos, pears, apples, quinces, loquats, citrus, figs, papayas, avocados, coconuts, durians, guavas, persimmons, and pomegranates. In some embodiments, the plants can be any tree with agricultural purposes. In some embodiments, the plants can be any tree with commercial purposes.

Referring to block 522, in some embodiments, the first plurality of images (e.g., for the first dataset) is obtained with a first vehicle, and the second plurality of images (e.g., for the second dataset) is obtained with a second vehicle. In some embodiments, the first and second vehicles are one or more unmanned aerial vehicles (UAV, such as a drone, a satellite, or an unmanned terrestrial vehicle).

In some embodiments, the method further comprises obtaining: a first route record for the first vehicle corresponding to the first plurality of images, and a second route record for the second vehicle corresponding to the second plurality of images. In some embodiments, the first route record comprises a first record over the first agricultural plot; and the second route record comprises a first record over the second agricultural plot.

In some embodiments, the first route record further comprises a respective height and a respective location for each image in the first plurality of images, where each image in the first plurality of images is evaluated for satisfaction of one or more validation criteria. In some embodiments, the second route record further comprises a respective height and a respective location for each image in the second plurality of images, where each image in the second plurality of images is evaluated for satisfaction of one or more validation criteria.

In some embodiments, the first route record further comprises a respective height and a respective location (e.g., as determined by a GNSS—a Global Navigation Satellite System such as GPS, GLONASS, Galileo, Beidou (generally referred to as GPS throughout), IMU—inertial measurement unit, Kalman filtering, etc., or a combination thereof) for each image in the first plurality of images, and each image in the first plurality of images is evaluated for satisfaction of one or more validation criteria. In some embodiments, one or more images in the first plurality of images that fail the one or more validation criteria are discarded. In some embodiments, the second route record further comprises a respective height and a respective location (e.g., detected by GPS, IMU—inertial measurement unit, Kalman filtering, etc., or a combination thereof) for each image in the second plurality of images, and each image in the second plurality of images is evaluated for satisfaction of one or more validation criteria. In some embodiments, one or more images in the second plurality of images that fail the one or more validation criteria are discarded. In some embodiments, the one or more validation criteria comprise determining whether each image includes a respective plant contour. In some embodiments, the one or more validation criteria comprise determining whether each image is in focus. In some embodiments, the first route record further comprises iii) a respective timestamp for each image in the first plurality of images. In some embodiments, the second route record further comprises iii) a respective timestamp in the second plurality of images.

In some embodiments, the first vehicle and the second vehicle include an RGB camera. In some such embodiments, each image in the first and second plurality of images comprises a corresponding RGB image.

Block 524. Referring to block 524 of FIG. 5C, the method continues by extracting from the third dataset, one or more corresponding second plant features for a second plurality of plants in the second agricultural plot. Referring to block 526, in some embodiments, the one or more corresponding first plant features and the one or more corresponding second plant features each comprise one or more plant features selected from the group consisting of: plant canopy area, plant canopy circumference, plant canopy diameter, and a combination thereof.

In some embodiments, the extracting from the third dataset further comprises, for each plant in the second plurality of plants: identifying a respective plant contour by applying at least one image from the second plurality of images to the trained additional model as described with regards to block 504, and determining, from the respective plant contour, the one or more corresponding second plant features.

Referring to block 528, in some embodiments, the one or more corresponding second plant features includes, for each plant of the second plurality of plants a corresponding third plant location. In some embodiments, for each respective plant in the second plurality of plants, the respective third plant location is centered on the respective plant canopy area. In some embodiments, each respective first plant location, each respective second plant location, and each respective third plant location comprises GPS coordinates.

In some embodiments, referring to block 530, the method further comprises determining from the second plurality of images, for each plant in the second plurality of plants, a respective canopy color. In some embodiments, determining respective canopy color for plants in the second plurality of plants further comprises applying the second plurality of images to an additional model trained to determine plant color from plant contours (e.g., where a model trained to determine plant color is trained similarly to the training of an additional model for the determination of plant contours as described in block 504). In some embodiments, the method further comprises providing a histogram of plant color. In some embodiments, the histogram of plant colors provides a count or percentage of plants for each respective plant color bin. In some embodiments, the histogram of plant colors provides a projected distribution of plant colors for a later time (e.g., for a future season or for a later time in the current season) based at least in part on one or more sets of current or past observations.

Referring to block 532, in some embodiments, the method further comprises determining a corresponding health score for each respective plant in the second plurality of plants based at least in part on the respective canopy color for each plant. For example, respective plants with a higher percentage of green vs non-green area or a higher NDRE value in their corresponding plant canopy areas are assigned higher health scores. In some embodiments, a respective plant with a corresponding health score below a health score threshold is deemed non-bearing, and congruently all other plants (e.g., those with health scores above the health score threshold) are deemed to be bearing. Health scores provide an indication of the productivity of particular plants (e.g., whether a particular plant is likely to produce and how much yield can be expected).

Block 534. Referring to block 534, the method proceeds by estimating for each the second plurality of plants, the respective age of the plant by inputting at least some of the plant's respective one or more second plant features into the trained model. In some embodiments, each respective plant age comprises a scion plant age or leaf age. In some embodiments, each plant in the first plurality of plants includes rootstock and a scion, and the respective plant age comprises a scion plant age distinct from the rootstock plant age. In some embodiments, scion plant age is equivalent to the age of a plant canopy but not the rootstock (e.g., for a plant that has been grafted or top worked, where the crown is the productive or fruiting part of the plant). Scion plant image is, in some embodiments, equivalent to plant age or rootstock plant age (e.g., for plants that have not been grafted). In some embodiments, the method further comprises providing a respective confidence value for each respective plant age.

In some embodiments, the method further comprises determining from a respective plant age an estimate of current plant productivity for the respective plant. In some embodiments, the method further comprises determining from a respective plant age an estimate of future plant productivity for the respective plant. In some embodiments, the method further comprises determining, from each respective plant age for the subset of plants of the second plurality of plants, an estimate of plant productivity for the second agricultural plot (e.g., by aggregating the respective estimated productivity for respective plants). In some embodiments, estimates of plant productivity can be used to inform pest and disease management strategies for the second agricultural plot.

Referring to block 536, in some embodiments, the method further comprises displaying a histogram of plant age (e.g., plant maturity) using the ages for the second plurality of plants. In some embodiments, the histogram of plant ages provides a count or percentage of plants for each respective plant age bin (e.g., age is binned in integers). In some embodiments, the histogram of plant ages provides a projected (estimated) distribution of plant ages for a later time (e.g., in a future season) based at least in part on one or more sets of current or past observations (e.g., where the sets of observations include the images described throughout this disclosure).

In some embodiments, the method further comprises identifying one or more plants with a respective age greater than an age threshold. Many plant types require multiple seasons of growth before reaching peak productivity (at which point they have the highest agricultural value and highest insurance value). In addition, most types of plants experience decreasing productivity after a certain age (at which point their agricultural and insurance value decreases). In some embodiments, the age threshold is at least 1 year, at least 2 years, at least 3 years, at least 4 years, at least 5 years, at least 6 years, at least 7 years, at least 8 years, at least 9 years, at least 10 years, at least 11 years, at least 12 years, at least 13 years, at least 14 years, or at least 15 years.

In some embodiments, referring to block 538, the method further comprises repeating the method at one or more time points, thereby obtaining one or more updates of plant age (e.g., to obtain plant age estimates at a plurality of time points such as over multiple seasons).

Additional Embodiments

Figure 6A:
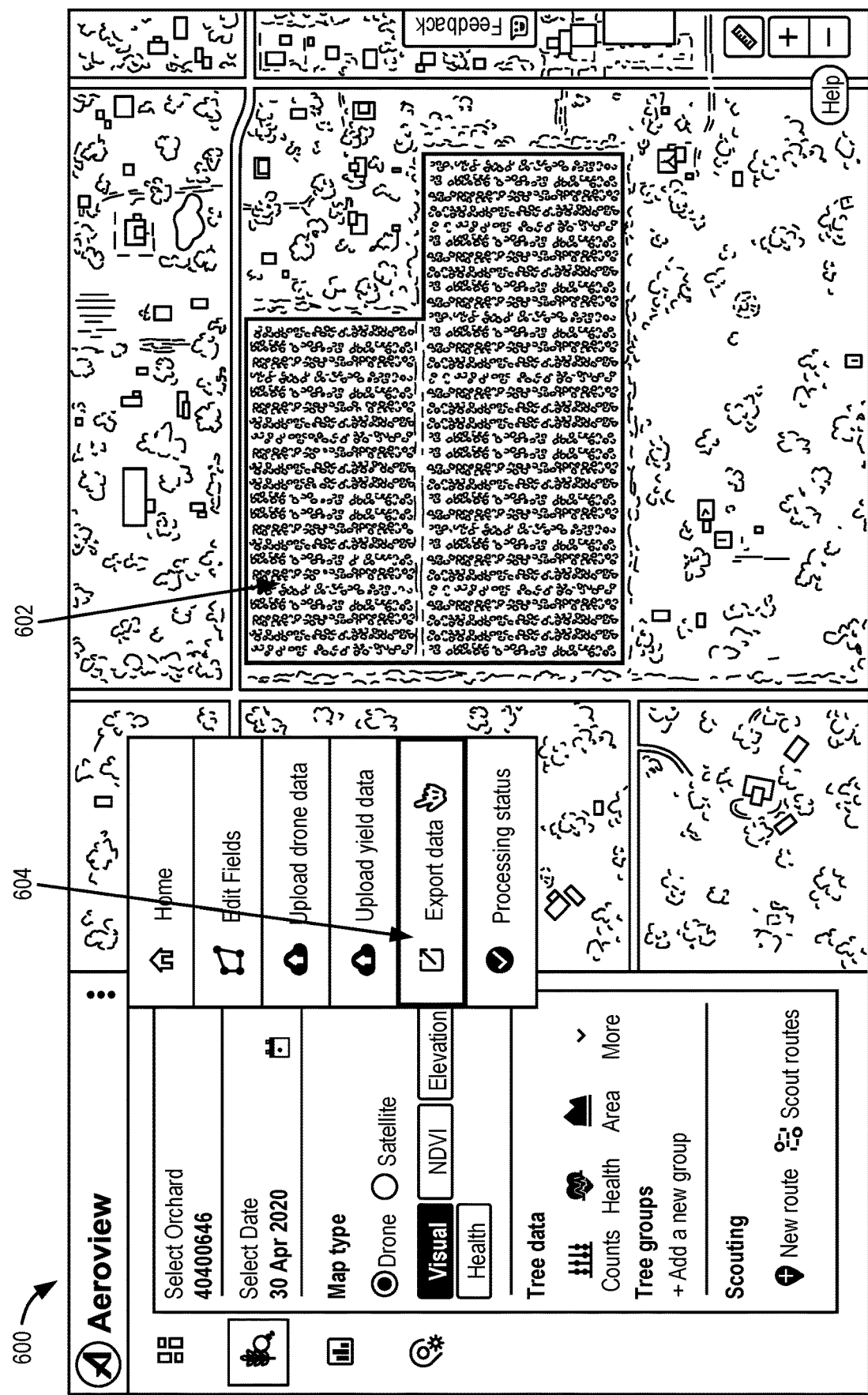
FIGS. 6A and 6B collectively illustrate example user interfaces in accordance with some embodiments of the present disclosure.
Figure 6B:
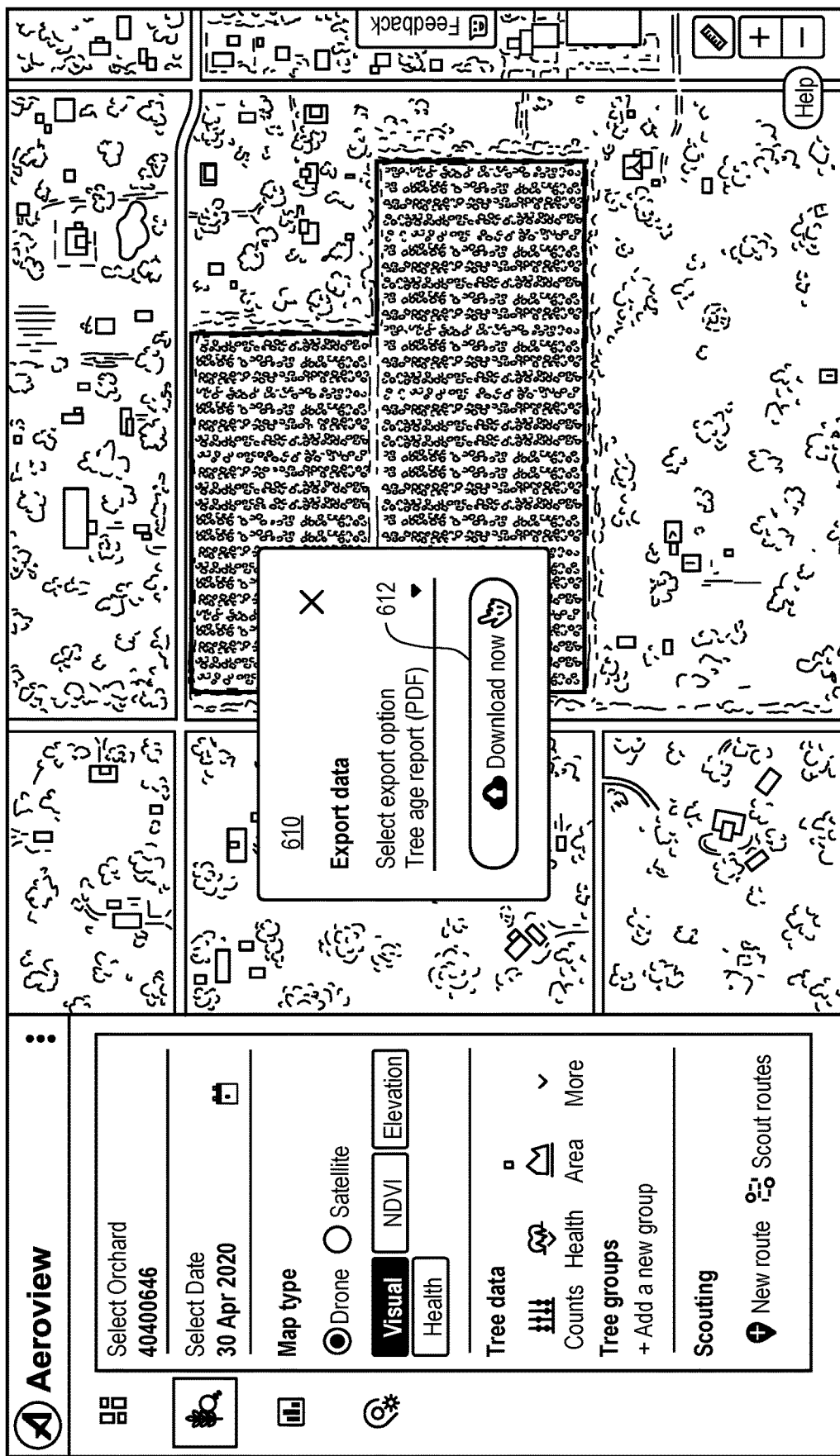

In some embodiments, a user interface 600 provides a visual indication of the agricultural plot as shown in FIGS. 6A and 6B (e.g., agricultural plot 602). In some embodiments, the first or second UAV is a drone and the first or second UAV follows a predetermined route (e.g., the first or second route) to obtain the second plurality of images of the second agricultural plot. The benefit of using a predetermined route is that it provides more reproducibility for evaluating an agricultural plot over time (e.g., over multiple seasons). In some embodiments, the first or second UAV is a satellite and the second plurality of images is obtained from one or more satellite images encompassing the second agricultural plot (e.g., the one or more satellite images are cropped). In some embodiments, user interface includes an option for a user to export information (e.g., option 604). In some embodiments, as shown in FIG. 6B, upon detecting a user input on option 604, a popup window 610 is displayed with a download button 612 that, upon selection by a user input, will download information for agricultural plot 602.

Figure 7A:
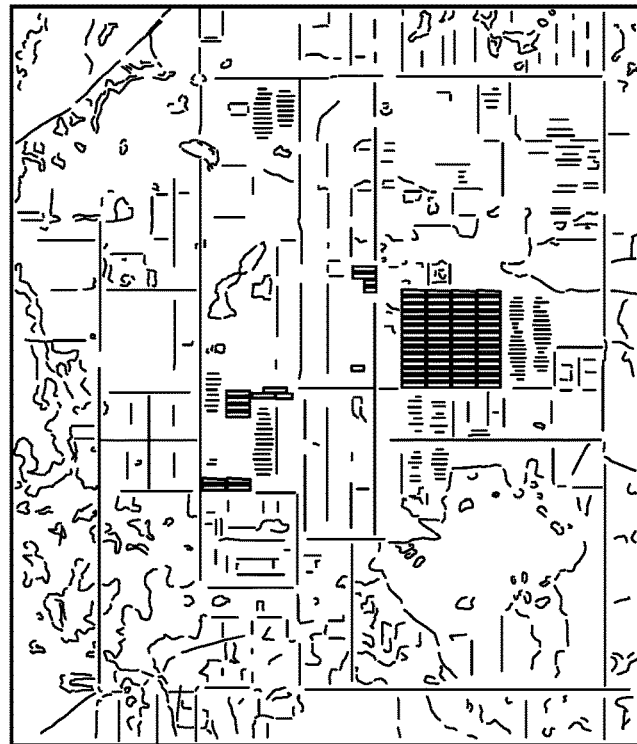
FIGS. 7A and 7B collectively illustrate an example of a plant age report provided to the user, in accordance with some embodiments of the present disclosure.
Figure 7B:
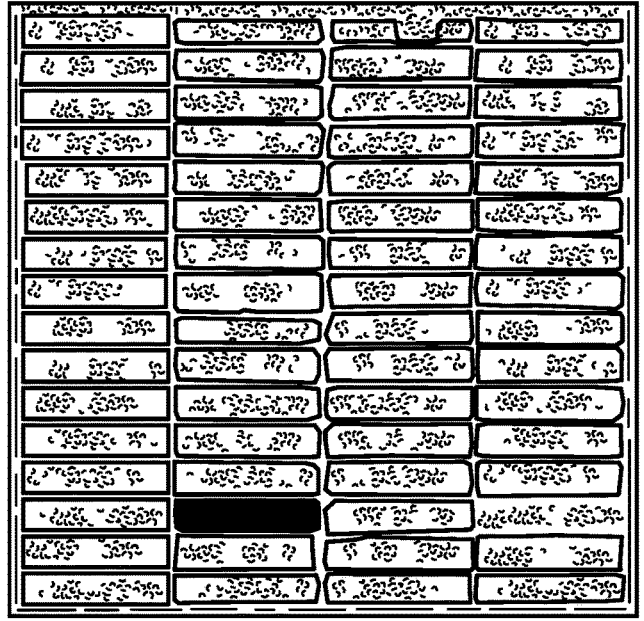

In some embodiments, the method further comprises providing a plant age report (e.g., with plant ages binned by leaf year) to the user (e.g., as illustrated in FIGS. 7A and 7B). In some embodiments, the plant age report is part of the information downloaded as described with regards to FIG. 6B. FIG. 7A provides a summary 700 of the plant age report, while FIG. 7B provides a more detailed plant age report 702 for an individual agricultural plot.

In some embodiments, the method further comprises determining a percent stand (e.g., a boundary estimation) for the second agricultural plot based at least in part on a plot area of the second agricultural plot and a total plant area of the second plurality of plants. For instance, in some embodiments, the percent stand comprises the ratio of total plant area to the plot area (e.g., what ratio of the available space is planted). In some such embodiments, the total plant area is determined from the corresponding one or more second plant features for each respective plant in the second plurality of plants. For example, in some embodiments, the total plant area of the second plurality of plants is determined by aggregating the respective plant contours for each plant in the second plurality of plants.

In some embodiments, the plot area corresponds to a polygon boundary of the planted area of the second agricultural plot. In some embodiments, determining the plot area comprises determining a concave hull encompassing all the respective plant contours (e.g., where the concave hull is an efficient representation of the total area in the agricultural plot that is planted). Moreira and Santos 2006 provide examples of the use of concave hull calculations for the purpose of area determinations ("Concave Hull: A k-Nearest Neighbours Approach for The Computation of The Region Occupied By A Set of Points" *Proc. 2nd Int. Conf. Comput. Graph. Theory Appl.* (*GRAPP* 2007), Barcelona, Spain, pp. 61-68). In some embodiments, the concave hull is configured not to penetrate through gaps between plants that are smaller than the known spacing between rows in the plurality of rows in the second agricultural plot. In this way it provides a granular outline of the planted area, without incorrectly omitting individual plants or rows. This concave hull is then used as a high-fidelity estimate of the plot boundary and can be used to calculate the plot area.

In some embodiments, the second agricultural plot comprises a plurality of hedgerows with predetermined hedgerow spacing, where each hedgerow in the plurality of hedgerows includes a respective set of one or more plants from the second plurality of plants with predetermined plant spacing and a respective initial plant location.

In some such embodiments, for each plant in a respective set of one or more plants in a respective hedgerow the one or more corresponding second plant features each comprise one or more plant features selected from the group consisting of: a respective hedge canopy area and a respective hedge canopy circumference, hedge canopy diameter, and a combination thereof. In some embodiments, the method identifies missing plants for a hedgerow based on a comparison of expected plant location vs observed plant location for each plant. In some embodiments, the method further comprises, for each plant in a respective set of one or more plants in a respective hedgerow, determining a respective fourth plant location based at least in part on the predetermined plant spacing and the respective initial plant location for the respective hedgerow, and comparing the respective third plant location to the respective fourth plant location. In some embodiments, the respective plant is deemed missing when the distance between the respective third plant location and the respective fourth plant location is above a predetermined distance threshold (e.g., as described above with regards to block 514). The method further comprise determining, for each hedgerow in the plurality of hedgerows, a percentage of missing plants, where a respective hedgerow is deemed missing when the percentage of missing plants is above a predetermined missing plant threshold (e.g., similar to the determination of missing rows as described above with regards to block 512).

Historical information of an agricultural plot (e.g., information from previous seasons or from earlier in the current season) can also be incorporated into determinations of plant age and/or plant health. In some embodiments, the method further comprises: obtaining historical age information for the second agricultural plot, including corresponding historical age information for at least an additional subset of plants of the second plurality of plants, and estimating, for each of the additional subset of plants, the respective age of the plant by inputting at least some of the plant's respective one or more second plant features and corresponding historical age information into the trained model. In some embodiments, the historical age information comprises a historical plurality of images of the second agricultural plot, where the historical plurality of images is aerial views of the second agricultural plot.

In some embodiments, another aspect of the present disclosure provides a method of estimating plant age, using a previously trained model. The method comprises obtaining, in electronic format, a third dataset comprising a second plurality of images of a second agricultural plot, where the second plurality of images are aerial views of the second agricultural plot. The method further includes extracting from the third dataset, one or more corresponding second plant features for a second plurality of plants in the second agricultural plot. The method further comprises estimating, for each of the second plurality of plants, the respective age of the plant by inputting at least some of the plant's respective one or more second plant features into a trained model.

In some embodiments, the method further comprises training the model using previously collected training data (e.g., a first dataset and a second dataset). In some such embodiments, the method further comprises obtaining, in electronic format, a first dataset comprising a first plurality of images of a first plurality of plants in a first agricultural plot, where the first plurality of images are aerial views of the first agricultural plot. In some embodiments, the method further includes extracting from the first dataset, for each plant of the first plurality of plants, one or more corresponding first plant features, including a corresponding first plant location. In some embodiments, the method further includes obtaining, in electronic format, a second dataset comprising, for each plant of the first plurality of plants growing in the first agricultural plot, a respective second plant location and a respective plant age. In some embodiments, the method further comprises associating each plant of the first plurality of plants with its respective plant age by correlating each plant's respective first plant location with its respective second plant location. In some embodiments, the method further includes using, for each plant in the first plurality of plants, at least one of the one or more corresponding first plant features and the respective plant age to train the model for plant age determination.

CONCLUSION

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event (" or "in response to detecting (the stated condition or event)," depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purposes of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for estimating plant age, the method comprising:
   obtaining, in electronic format, a first dataset comprising a first plurality of images of a first plurality of plants in a first agricultural plot, wherein the first plurality of images are aerial views of the first agricultural plot;
   extracting from the first dataset, for each plant of the first plurality of plants, one or more corresponding first plant features, including a corresponding first plant location;
   obtaining, in electronic format, a second dataset comprising, for each plant of the first plurality of plants growing in the first agricultural plot, a respective second plant location and a respective plant age;
   associating each plant of the first plurality of plants with its respective plant age by correlating each plant's respective first plant location with its respective second plant location;
   using, for each plant in the first plurality of plants, at least one of the one or more corresponding first plant features and the respective plant age to train a model for plant age determination;
   obtaining, in electronic format, a third dataset comprising a second plurality of images of a second agricultural plot, wherein the second plurality of images are aerial views of the second agricultural plot;
   extracting from the third dataset, one or more corresponding second plant features for a second plurality of plants in the second agricultural plot; and estimating, for each of the second plurality of plants, the respective age of the plant by inputting at least some of the plant's respective one or more second plant features into the trained model.

2. The method of claim 1, wherein the associating further comprises performing one or more quality control tests by comparing the first and second datasets, comprising at least one of: (i) a first quality control test for the first agricultural plot, and (ii) a second quality control test for each respective plant in the first plurality of plants.

3. The method of claim 2, wherein:
the first agricultural plot comprises a plurality of rows, wherein each row in the plurality of rows includes a respective set of plants of the first plurality of plants,
the associating comprises performing the first quality control test, wherein, for each row in the plurality of rows, the first quality control test for the first agricultural plot comprises:
identifying, from the second dataset, a respective initial plant with a respective first plant location and a respective second plant location; and
determining a distance between the initial plant's first plant location and its second plant location,
upon determining that the distance between the initial plant's first plant location and its second plant location is above a predetermined threshold distance, no longer considering the respective row.

4. The method of claim 2, wherein:
the associating comprises performing the second quality control test, wherein performing the second quality control test for a respective plant in the first plurality of plants further comprises:
determining a distance between the respective plant's first plant location and its second plant location; and
upon determining that the distance between the respective plant's first plant location and its second plant location is above a predetermined threshold distance, no longer considering the respective plant.

5. The method of claim 1, further comprising training an additional model for distinguishing plants within in an image, wherein the training comprises:
obtaining, in electronic format, a segmentation training dataset, wherein the segmentation training dataset comprises a plurality of training images, wherein each training image is a respective aerial view of a training agricultural plot;
determining, from the plurality of training images, for each respective plant in a plurality of training plants, a corresponding plant contour; and
using, for each respective plant in the plurality of training plants, at least the respective training image and the corresponding plant contour to train the additional model for distinguishing plants within an image.

6. The method of claim 5, wherein the extracting from the first dataset further comprises, for each plant in the first plurality of plants:
identifying a respective plant contour by applying at least one image from the first plurality of images to the trained additional model; and
determining, from the respective plant contour, the one or more corresponding first plant features.

7. The method of claim 5, wherein the extracting from the third dataset further comprises, for each plant in the second plurality of plants:
identifying a respective plant contour by applying at least one image from the second plurality of images to the trained additional model; and
determining, from the respective plant contour, the one or more corresponding second plant features.

8. The method of claim 1, wherein the one or more corresponding first plant features and the one or more corresponding second plant features each comprise one or more plant features selected from the group consisting of: plant canopy area, plant canopy circumference, plant canopy diameter, and a combination thereof.

9. The method of claim 8, wherein:
the one or more corresponding first plant features and the one or more corresponding second plant features each comprise a respective plant canopy area; and
for each respective plant in the first plurality of plants, the respective first plant location is centered on the respective plant canopy area.

10. The method of claim 1, wherein the one or more corresponding second plant features include, for each plant of the second plurality of plants, a corresponding third plant location.

11. The method of claim 10, wherein each respective first plant location, each respective second plant location, and each respective third plant location comprises GPS coordinates.

12. The method of claim 10, wherein:
the second agricultural plot comprises a plurality of hedgerows with predetermined hedgerow spacing, wherein each hedgerow in the plurality of hedgerows includes a respective set of one or more plants from the second plurality of plants with predetermined plant spacing and a respective initial plant location.

13. The method of claim 12, further comprising:
for each plant in a respective set of one or more plants in a respective hedgerow, the one or more corresponding second plant features are selected from the group consisting of: a respective hedge canopy area and a respective hedge canopy circumference, hedge canopy diameter, and a combination thereof.

14. The method of claim 12, further comprising:
for each plant in a respective set of one or more plants in a respective hedgerow:
determining a respective fourth plant location based at least in part on the predetermined plant spacing and the respective initial plant location for the respective hedgerow; and
comparing the respective third plant location to the respective fourth plant location, wherein the respective plant is deemed missing when the comparison of the respective third plant location and the respective fourth plant location is above a predetermined distance threshold; and
determining, for each hedgerow in the plurality of hedgerows, a percentage of missing plants, wherein a respective hedgerow is deemed missing when the percentage of missing plants is above a predetermined missing plant threshold.

15. The method of claim 1, wherein the first plurality of images is obtained with a first vehicle, and the second plurality of images is obtained with a second vehicle.

16. The method of claim 15, wherein at least one of the first and second vehicle is an unmanned aerial vehicle (UAV).

17. The method of claim 1, wherein each respective plant age comprises a scion plant age.

18. A computer system, comprising:
one or more processors; and
memory storing one or more programs, the one or more programs including instructions for:

obtaining, in electronic format, a first dataset comprising a first plurality of images of a first plurality of plants in a first agricultural plot, wherein the first plurality of images are aerial views of the first agricultural plot;

extracting from the first dataset, for each plant of the first plurality of plants, one or more corresponding first plant features, including a corresponding first plant location;

obtaining, in electronic format, a second dataset comprising, for each plant of the first plurality of plants growing in the first agricultural plot, a respective second plant location and a respective plant age;

associating each plant of the first plurality of plants with its respective plant age by correlating each plant's respective first plant location with its respective second plant location;

using, for each plant in the first plurality of plants, at least one of the one or more corresponding first plant features and the respective plant age to train a model for plant age determination;

obtaining, in electronic format, a third dataset comprising a second plurality of images of a second agricultural plot, wherein the second plurality of images are aerial views of the second agricultural plot;

extracting from the third dataset, one or more corresponding second plant features for a second plurality of plants in the second agricultural plot; and estimating, for each of the second plurality of plants, the respective age of the plant by inputting at least some of the plant's respective one or more second plant features into the trained model.

19. A non-transitory computer-readable storage medium storing instruction, when executed by a computer system with one or more processors, cause the one or more processors to perform a set of operations, comprising:

obtaining, in electronic format, a first dataset comprising a first plurality of images of a first plurality of plants in a first agricultural plot, wherein the first plurality of images are aerial views of the first agricultural plot;

extracting from the first dataset, for each plant of the first plurality of plants, one or more corresponding first plant features, including a corresponding first plant location;

obtaining, in electronic format, a second dataset comprising, for each plant of the first plurality of plants growing in the first agricultural plot, a respective second plant location and a respective plant age;

associating each plant of the first plurality of plants with its respective plant age by correlating each plant's respective first plant location with its respective second plant location;

using, for each plant in the first plurality of plants, at least one of the one or more corresponding first plant features and the respective plant age to train a model for plant age determination;

obtaining, in electronic format, a third dataset comprising a second plurality of images of a second agricultural plot, wherein the second plurality of images are aerial views of the second agricultural plot;

extracting from the third dataset, one or more corresponding second plant features for a second plurality of plants in the second agricultural plot; and estimating, for each of the second plurality of plants, the respective age of the plant by inputting at least some of the plant's respective one or more second plant features into the trained model.

* * * * *